US007123463B2

(12) United States Patent
Devine et al.

(10) Patent No.: US 7,123,463 B2

(45) Date of Patent: Oct. 17, 2006

(54) SURGE LIGHTNING PROTECTION DEVICE

(75) Inventors: Edward Devine, deceased, late of Shererville, IN (US); by Frances G. Devine, Jr., legal representative, Shererville, IN (US); Ildefonso Hernandez, College Park, MD (US); James Kirk, New Lenox, IL (US); Gene S. Anderson, Elburn, IL (US); Frank A. Harwath, Naperville, IL (US)

(73) Assignee: Andrew Corporation, Orland Park, IL (US)

( * ) Notice: Subject to any disclaimer, the term of this patent is extended or adjusted under 35 U.S.C. 154(b) by 323 days.

(21) Appl. No.: 10/411,622

(22) Filed: Apr. 10, 2003

(65) Prior Publication Data

US 2004/0042149 A1 Mar. 4, 2004

Related U.S. Application Data

(60) Provisional application No. 60/372,665, filed on Apr. 15, 2002.

(51) Int. Cl.
*H02H 1/00* (2006.01)

(52) U.S. Cl. ........................................................ 361/119

(58) Field of Classification Search ......... 361/118–120, 361/56, 113, 115; 29/471; 439/52
See application file for complete search history.

(56) References Cited

U.S. PATENT DOCUMENTS

| | | | | |
|---|---|---|---|---|
| 1,430,674 | A | | 10/1922 | Narans et al. |
| 1,987,575 | A | | 1/1935 | Loy |
| 3,254,872 | A | * | 6/1966 | Roos .......................... 251/163 |
| 3,504,226 | A | | 3/1970 | Stetson |
| 3,577,032 | A | | 5/1971 | McStrack et al. |
| 3,663,856 | A | | 5/1972 | Miske, Jr. |
| 3,807,031 | A | * | 4/1974 | Jachimowicz et al. ...... 228/148 |
| 4,314,303 | A | | 2/1982 | Bitsch et al. |
| 4,355,345 | A | | 10/1982 | Franchet |
| 4,370,511 | A | * | 1/1983 | Cookson et al. .......... 174/14 R |
| 4,409,637 | A | | 10/1983 | Block |
| 4,447,848 | A | | 5/1984 | Smith |
| 4,486,805 | A | | 12/1984 | Cline |
| 4,544,984 | A | * | 10/1985 | Kawanami et al. ......... 361/119 |
| 4,644,441 | A | | 2/1987 | Igarashi |

(Continued)

FOREIGN PATENT DOCUMENTS

EP 0 840 413 A1 11/1997 ................. 361/119

*Primary Examiner*—Ronald Leja
(74) *Attorney, Agent, or Firm*—Barnes & Thornburg LLP

(57) ABSTRACT

A lightning surge protector configured for use with coaxial lines is disclosed. The lightning surge protector includes an inner conductor comprising two conductive portions mechanically and capacitively coupled together, and displaced from one another, by a dielectric material which may be injection molded or snapped onto the conductive portions. Insulating material extends between the inner conductor and an outer conductor to electrically insulate the inner conductor from the outer conductor. An inductor inductively couples the inner conductor to the outer conductor and is coupled between the two using a solderless connection. The inductor has a bent end which may be inserted in a hole in the inner conductor and a straight end that may be staked in a hole in the outer conductor. The outer conductor is formed from a case and a plug which are frictionally coupled. The configuration of the components allows for components to be assembled into modules and sub-assemblies which facilitates pressing the modules and sub-assemblies together to reduce assembly costs.

23 Claims, 9 Drawing Sheets

U.S. PATENT DOCUMENTS 5,283,709 A 2/1994 Shirakawa et al.
5,652,690 A 7/1997 Mansfield et al.
5,768,084 A * 6/1998 Chaudhry et al. .......... 361/120
5,790,361 A 8/1998 Minich
5,790,362 A 8/1998 Kasahara et al.
5,831,808 A 11/1998 Girard
5,875,090 A 2/1999 Joulie et al.
5,963,413 A 10/1999 Zahlmann et al.
5,987,335 A 11/1999 Knoedl, Jr. et al.
6,061,223 A 5/2000 Jones et al.
6,115,227 A 9/2000 Jones et al.
6,236,551 B1 5/2001 Jones et al.
6,362,425 B1 * 3/2002 Chilton et al. ................ 174/51
6,450,829 B1 * 9/2002 Weisz-Margulescu ....... 439/352
6,636,408 B1 * 10/2003 Pagliuca ..................... 361/119

* cited by examiner

SURGE LIGHTNING PROTECTION DEVICE

CROSS-REFERENCE TO RELATED APPLICATION

This application claims priority to, and the benefit of, U.S. provisional patent application Ser. No. 60/372,665 filed Apr. 15, 2002, the disclosure of which is incorporated herein by reference.

BACKGROUND OF THE INVENTION

This invention relates generally to surge protection and more particularly to surge protectors for hardware receiving signals via coaxial cable.

It is well known to provide electronic devices with surge protectors, lightning arrestors and bypass circuitry to protect the device from surges on the power input and signal input. Surge protectors, lightning arrestors and bypass circuitry are shown in Jones et al., U.S. Pat. No. 6,236,551B1, issued May 22, 2001; Jones et al. U.S. Pat. No. 6,115,227, issued Sep. 5, 2000; Jones et al., U.S. Pat. No. 6,061,223, issued May 9, 2000; Knoedl, Jr. et al, U.S. Pat. No. 5,987,335, issued Nov. 16, 1999; Zahlman et al., U.S. Pat. No. 5,963, 413, issued Oct. 5, 1999; Joulie et al., U.S. Pat. No. 5,875,090, issued Feb. 23, 1999; Girard, U.S. Pat. No. 5,831,808, issued Nov. 3, 1998; Kashara et al., U.S. Pat. No. 5,790,362, issued Aug. 4, 1998; Minich, U.S. Pat. No. 5,790,361, issued Aug. 4, 1998; Mansfield et al., U.S. Pat. No. 5,652,690, issued Jul. 29, 1997; Shirakawa et al., U.S. Pat. No. 5,283,709, issued Feb. 1, 1994; Igarashi, U.S. Pat. No. 4,644,441, issued Feb. 17, 1987; Cline, U.S. Pat. No. 4,486,805, issued Dec. 4, 1984; Smith, U.S. Pat. No. 4,447, 848, issued May 8, 1984; Block, U.S. Pat. No. 4,409,637, issued Oct. 11, 1983; Franchet, U.S. Pat. No. 4,355,345, issued Oct. 19, 1982; Bitsch et al., U.S. Pat. No. 4,314,303, issued Feb. 2, 1982; Miske, Jr., U.S. Pat. No. 3,663,856, issued May 16, 1972; McStrack, U.S. Pat. No. 3,577,032, issued May 4, 1971; Stetson, U.S. Pat. No. 3,504,226, issued Mar. 31, 1970; Loy, U.S. Pat. No. 1,987,575, issued Jan. 8, 1935; and Narans et al., U.S. Pat. No. 1,430,674, issued Oct. 3, 1922, the disclosures of which are hereby incorporated by this reference.

Jones et al., U.S. Pat. No. 6,236,551 B1 ("Jones '551") Jones et al., U.S. Pat. No. 6,115,227 ("Jones '227") and Jones et al., U.S. Pat. No. 6,061,223 ("Jones '223") ("collectively the Jones patents") are a family of patents issuing on the parent and continuations thereof and therefore provide the same disclosure. The Jones Patents show a connector for coaxial lines having a capacitive element and a spiral shaped inductive element designed to provide lightning protection while matching impedance of the incoming line. Thus, it is well known to configure and design connectors to match the impedance of incoming lines. It is also well known to utilize inductive and capacitive elements in a lightning surge protection device to tune the connector as shown in the Jones Patents, Block and Minich. Such devices use impedance matching techniques so that the lumped inductances and capacitances of the various components and structures of the connector, when taken together, exhibit the same characteristic impedance as the transmission line to which it is connected. However, such devices typically include multiple parts requiring calibration and tuning and often incorporate time intensive or complicated assembly techniques.

The present invention comprises one or more of the following features or combinations thereof. A lightning surge protection device is provided that is simple to manufacture and assemble yet provides lightning surge protection while remaining transparent to transmitted signals.

The surge protector for a signal receiving device configured to receive signals via a transmission line includes an inner conductor having a capacitance, an outer conductor, insulating material electrically insulating the inner conductor from the outer conductor and an inductor inductively coupling the inner conductor and outer conductor. Illustratively, the outer conductor is formed of two components that are coupled together. To aid in assembly of the lightning surge protector, the outer conductor may be formed from a case and a plug that is frictionally secured within the case. The inductor is solderlessly connected to the inner conductor and the outer conductor. The inner conductor includes a first conductive portion and a second conductive portion. Dielectric material separates the first conductive portion from the second conductive portion. The dielectric material may be injection molded to the first and second conductive portions of the inner conductor or may be a separate dielectric portion configured to snap onto the conductor portions. Illustratively, the dielectric portion partially encapsulates the first and second conductors to mechanically secure the conductors together. The dielectric material may be injection molded simultaneously with the insulating material to the first and second conductive portions to form an insulated inner conductor module. The insulating material includes a first insulating material insulating the first conductive portion from the outer conductor and a second insulating material insulating the second conductive portion from the outer conductor.

To reduce assembly costs, the inner conductor may include an inductor-receiving hole formed therein to receive a portion of the inductor therein to electrically and mechanically couple the inductor to the inner conductor. To facilitate solderless connection of the inductor to the inner conductor the inductor may include a bent portion which when inserted in the inductor-receiving hole is deformed so as to generate a restorative force-acting to couple the inductor to the inner conductor. To reduce the cost of manufacturing the surge protector, the conductive portion, case and plug may each be cast.

A method of manufacturing such a surge protection device is provided. The method comprises the steps of providing an insulated inner conductor, an inductor and an outer inductor which are assembled. The provided insulated inner conductor includes a first insulating portion coupled to a first conductor configured to be coupled to a signal carrying component of the signal receiving device and a second insulating portion coupled to a second conductor configured to be coupled to the inner conductor of the coaxial line. The first and second conductors are capactively coupled to one another. The provided outer conductor is a two component outer conductor. Each component of the outer conductor is configured to include a cavity sized to receive one of the first and second insulating portions therein and is configured to couple to the other component of the outer conductor. One component of outer conductor is configured to be coupled to an outer conductor of the coaxial line. The other component is configured to be coupled to a ground of the signal receiving device. The first insulating portion of the insulated inner conductor is inserted into the cavity of a selected one of the components of the outer conductor. The inductor is coupled between the insulated inner conductor and the selected one of the components of the outer conductor. The second insulating portion of the insulated inner conductor is inserted into the cavity of the other component of the outer conductor. The two components of the outer conductor are coupled whereby the inner conductor is electrically insulated from, but inductively coupled to, the outer conductor. The provided insulated inner conductor includes dielectric material mechanically and capacitively coupling the first conductor to the second conductor. The first insulating portion and the second insulating portion may be simultaneously molded to the first and second conductors. Similarly, the first insulating portion, the second insulating portion and the dielectric material may be simultaneously molded to the first and second conductors.

The inductor may include an inner conductor end and an outer conductor end, the provided insulated inner conductor includes an inductor-receiving hole, the selected component of the outer inductor includes an inductor-receiving hole and wherein the coupling the inductor step includes the steps of inserting the inner conductor end into the inductor-receiving hole of the insulated inner inductor and inserting the outer conductor end into the inductor-receiving hole of the selected component of the outer conductor. The outer conductor end of the inductor may be inserted into the inductor-receiving hole of the selected component of the outer conductor simultaneously with the insertion of the first insulating portion of the insulated inner conductor into the cavity of a selected one of the components of the outer conductor.

To facilitate solderless assembly of the inductor to the inner conductor, the inner conductor end of the inductor may include a bent portion so that insertion of the inner conductor end into the inductor-receiving hole of the inner conductor step causes deformation of the bent portion to generate a restorative force acting to couple the inductor to the inner conductor. Similarly, the outer conductor end of the inductor may be staked into the inductor receiving hole.

One component of the provided two component outer conductor may be a case having a cavity therein and the other component of the provided two component outer conductor may be a plug configured to be received in the cavity of the case. The plug may be the selected component. The first and second conductors of the insulated inner conductor and/or the two component of the outer conductor may be cast.

By pressing the two components of the outer conductor together, assembly costs may be reduced. Assembly costs may be further reduced by simultaneously inserting the second insulating portion of the insulated inner conductor into the cavity of the other component of the outer conductor while coupling the two components of the outer conductor.

Thus, the surge protector components are configured to generate modules and subassemblies facilitating assembly by pressing modules and subassemblies together.

Additional features and advantages of the invention will become apparent to those skilled in the art upon consideration of the following detailed description of illustrated embodiments exemplifying the best mode of carrying out the invention as presently perceived.

BRIEF DESCRIPTION OF THE DRAWINGS

The detailed description particularly refers to the accompanying drawings in which.

DETAILED DESCRIPTION OF THE DRAWINGS

Figure 1:
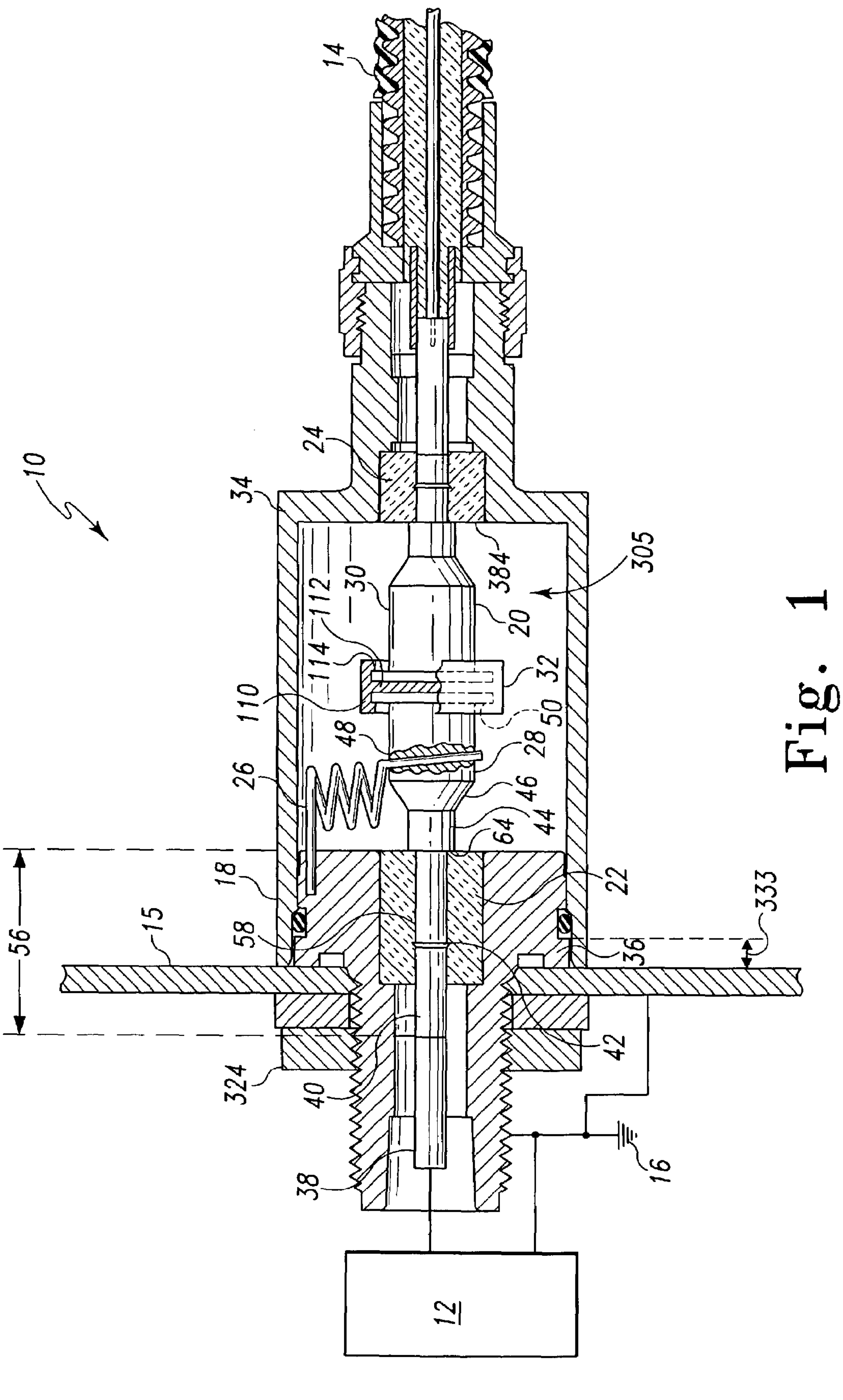
FIG. 1 is a partial sectional and partial diagrammatic view of a low cost lightning surge protection device coupled to a housing of hardware (shown diagrammatically) configured to receive signals within a specified bandwidth transmitted via a coaxial cable, the surge protector includes an inner conductor module having a surge side conductor capacitively and mechanically coupled by dielectric material to a protected side conductor, inner conductor module is disposed coaxially within a housing formed from a bulk head connector or plug and a case, insulative material electrically insulates inner connector module from housing and an inductive coil inductively couples inner module to housing.

The illustrated lightning surge protection device 10 is configured for utilization with hardware 12 configured to receive signals within a specified bandwidth transmitted via a transmission line 14, illustratively coaxial cable. The illustrated hardware 12 includes a chassis 15 coupled to ground 16. Those skilled in the art will recognize that while shown as being chassis grounded, hardware 12 may include a buss bar or other terminal, pig tail or conductor coupled to ground 16 to which surge protection device is coupled.

Surge protection device 10 includes a housing 18, an inner conductor module 20, protected side insulating cylinder 22 and surge side insulating cylinder 24 electrically insulating inner conductor module 20 from housing 18, and an inductor 26 inductively coupling inner conductor module 20 to housing 18. The assembly formed by inner conductor module and insulating cylinders 22, 24 are referred to as insulated inner conductor module 21. Inner conductor module 20 includes a protected side conductor 28 and a surge side conductor 30 and dielectric material 32 extending between protected side conductor 28 and surge side conductor 30 to mechanically and capacitively couple protected side conductor 28 and surge side conductor 30. Illustratively, housing 18 includes a hollow shell or case 34 and a plug or bulk head connector 36 press or snap fit together to form an outer conductor to be coupled to ground 16. An O-ring 37 is received in an annular groove 332 in bulk head connector 36 to engage both bulk head connector 36 and case 34 to provide weatherproofing.

Conductors 28 and 30 are generally similar in construction differing in some dimensional aspects. Protected side conductor 28 includes a female bulk head end connector 38, a shaft 40, a retention ring 42, a first transition 44, a second transition 46, a third transition 48, a plate 50, and longitudinal axis 52. Illustratively, female bulk head end connector 38 is an N-type female connector configuration made from Beryllium Titanium alloy commonly used for coaxial cable applications for mating with an N-type male connector. Those skilled in the art will recognize that the lightning surge protection device 10 may be provided with any appropriate connector within the teaching of the disclosure.

Figure 2:
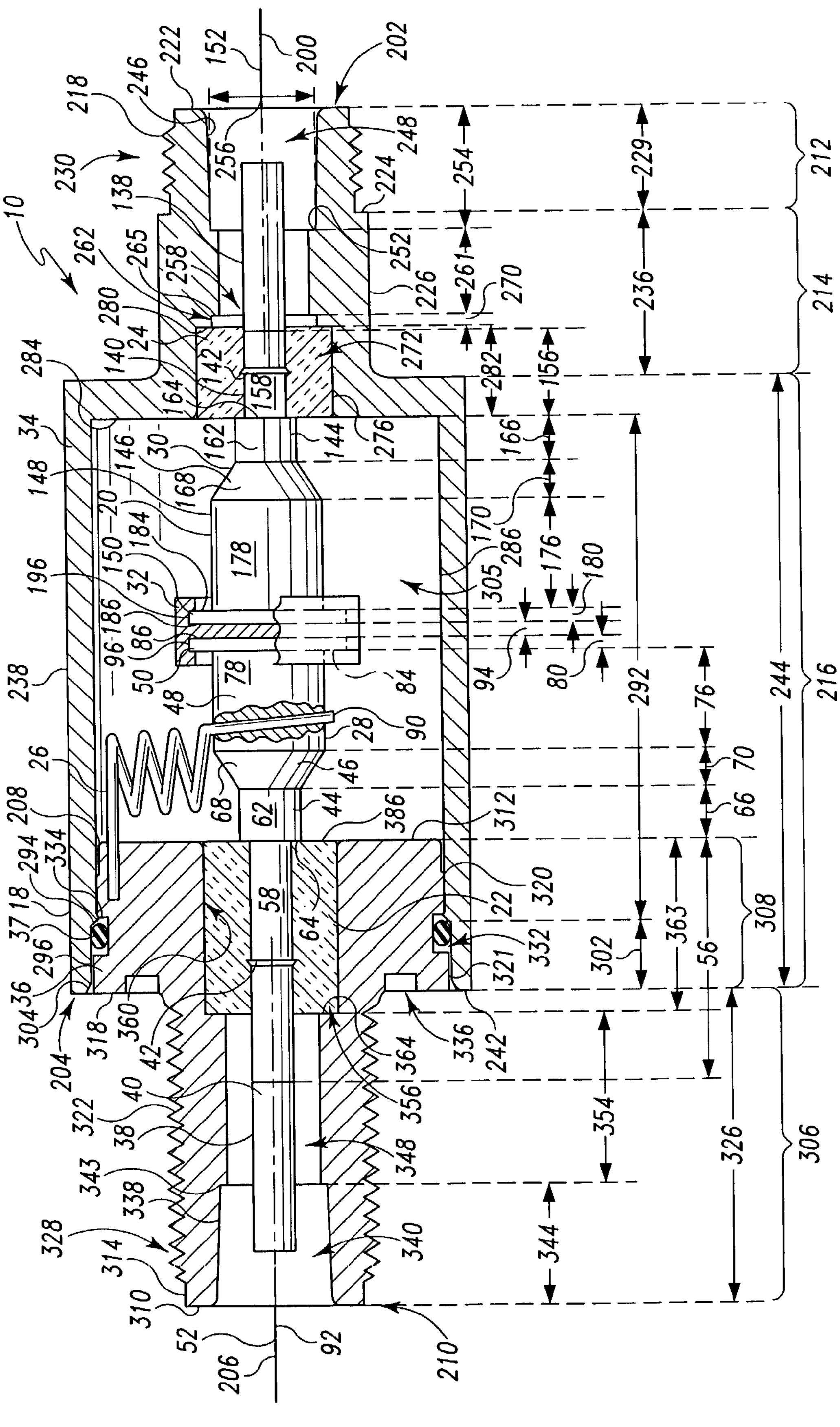
FIG. 2 is a sectional view of the surge protection device of FIG. 1.
Figure 4:
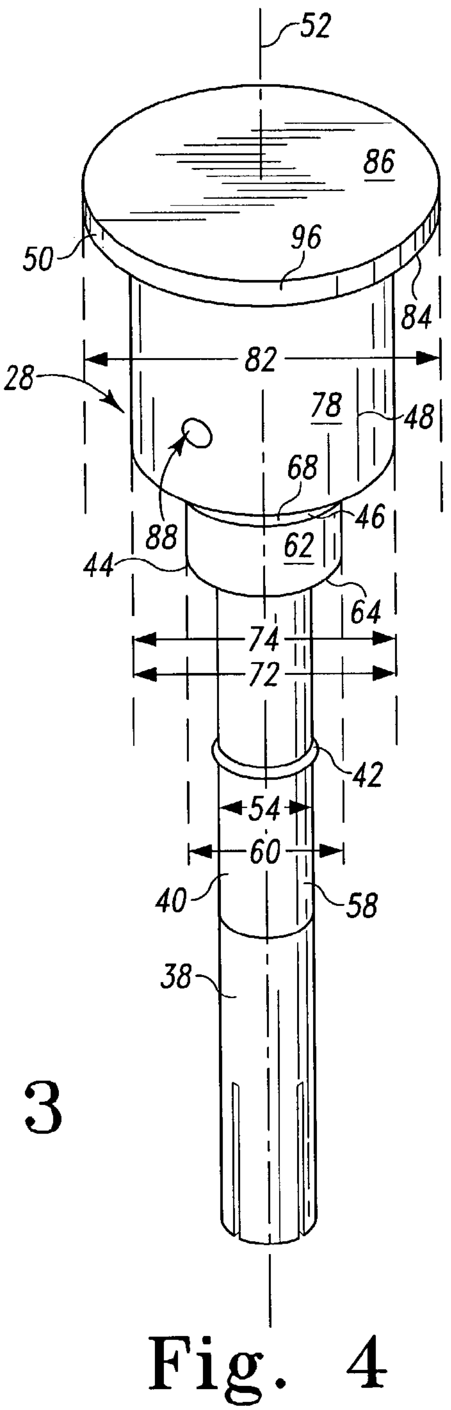
FIG. 4 is a perspective view of the protected side conductor of FIG. 1.

Referring generally to FIGS. 1, 2, 4, 6, 7, 9 and 10, and specifically to FIGS. 2 and 4, shaft 40 is electrically coupled to female bulk head end connector 38. Illustratively, shaft 40 has a uniform cylindrical cross-section having a diameter 54 along its length 56 except in the area of retention ring 42. Illustratively, retention ring 42 is a radially-extending annular ring peripherally extending about surface 58 of shaft 40. Illustratively, retention ring 42 has a triangular cross-section. Shaft 40 and retention ring 42 are embedded in protected side insulating cylinder 22. Illustratively, insulating material is injection molded about shaft 40 and retention ring 42 to form protected side insulating cylinder 22. Retention ring 42 aids in retaining shaft 40 within insulating material during assembly and disassembly of surge protector 10.

First transition 44 is coupled to shaft 40. First transition 44 has a cylindrical cross-section having a diameter 60 greater than diameter 54 of shaft 40. Thus, a step is formed between surface 58 of shaft 40 and surface 62 of first transition 44 which includes a radially-extending outwardly-facing wall 64, illustratively perpendicular to the longitudinal axis 52 of conductor 28. First transition 44 has a length 66.

Second transition 46 is coupled to first transition 44. Illustratively, second transition 46 is frusto-conical in shape. Illustratively, the external wall 68 of the second transition 46 forms approximately a 120 degree angle with the external wall or surface 62 of first transition 44. Second transition 46 has a longitudinal length 70.

Third transition 48 is coupled to second transition 46. Third transition 48 is cylindrical having a diameter 72 equal to the diameter 74 of the base of second transition 46. Third transition 48 has a length 76. External wall 78 of third transition 48 forms approximately a 210 degree angle with external wall 68 of second transition 46.

Plate 50 is a disk having a length 80 and a diameter 82 greater than the diameter 72 of third transition 48. Thus, plate 50 includes a radially-extending outwardly-facing wall 84 and radially-extending circular inwardly-facing wall 86. Both the outwardly-facing wall 84 and the inwardly-facing wall 86 are perpendicular to longitudinal axis 52 of protected side conductor 28.

Protected side conductor 28 includes an attachment through hole 88 for receipt of a first or conductor end portion 90 of inductor 26. Illustratively, attachment through hole 88 is formed at an angle to external wall 78 of third transition 48 and extends diametrically through third transition 48.

Figure 3:
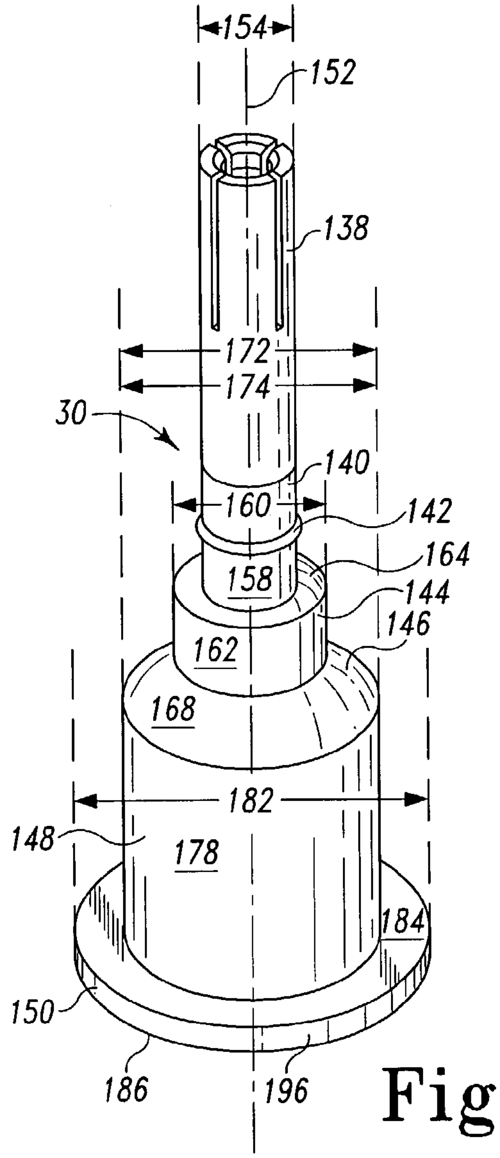
FIG. 3 is a perspective view of the surge side conductor of FIG. 1.

Referring generally to FIGS. 1, 2, 3, 6, 7, 9 and 10, and specifically to FIGS. 2 and 3, surge side conductor 30 includes a female cable end connector 138, a shaft 140, a retention ring 142, a first transition 144, a second transition 146, a third transition 148, a plate 150, and longitudinal axis 152. Illustratively, female cable end connector 138 is an N-type female connector configuration made from Beryllium Titanium alloy commonly used for coaxial cable applications for mating with an N-type male connector. Those skilled in the art will recognize that the lightning surge protection device 10 may be provided with any appropriate connector within the teaching of the disclosure.

Shaft 140 is electrically coupled to female cable end connector 138. Illustratively, shaft 140 has a uniform cylindrical cross-section having a diameter 154 along its length 156 except in the area of retention ring 142. Illustratively, retention ring 142 is a radially-extending annular ring peripherally extending about surface 158 of shaft 140. Illustratively, retention ring 142 has a triangular cross-section. Shaft 140 and retention ring 142 are embedded in surge side insulating cylinder 24. Illustratively, insulating material is injection molded about shaft 140 and retention ring 142 to form surge side insulating cylinder 24. Retention ring 142 aids in retaining shaft 140 within insulating material during assembly and disassembly of surge protector 10.

First transition 144 is coupled to shaft 140. First transition 144 has a cylindrical cross-section having a diameter 160 greater than diameter 154 of shaft 140. Thus, a step is formed between surface 158 of shaft 140 and surface 162 of first transition 144 which includes a radially-extending outwardly-facing wall 164, illustratively perpendicular to the longitudinal axis 152 of conductor 28. First transition 144 has a length 166.

Second transition 146 is coupled to first transition 144. Illustratively, second transition 146 is frusto-conical in shape. Illustratively, the external wall 168 of the second transition 146 forms approximately a 120 degree angle with the external wall or surface 162 of first transition 144. Second transition 146 has a longitudinal length 170.

Third transition 148 is coupled to second transition 146. Third transition 148 is cylindrical having a diameter 172 equal to the diameter 174 of the base of second transition 146. Third transition 148 has a length 176. External wall 178 of third transition 148 forms approximately a 210 degree angle with external wall 168 of second transition 146.

Plate 150 is a disk having a length 180 and a diameter 182 greater than the diameter 172 of third transition 148. Thus, plate 150 includes a radially-extending outwardly-facing wall 184 and radially-extending circular inwardly-facing wall 186. Both the outwardly-facing wall 184 and the inwardly-facing wall 186 are perpendicular to longitudinal axis 152 of surge side conductor 30.

Figure 10:
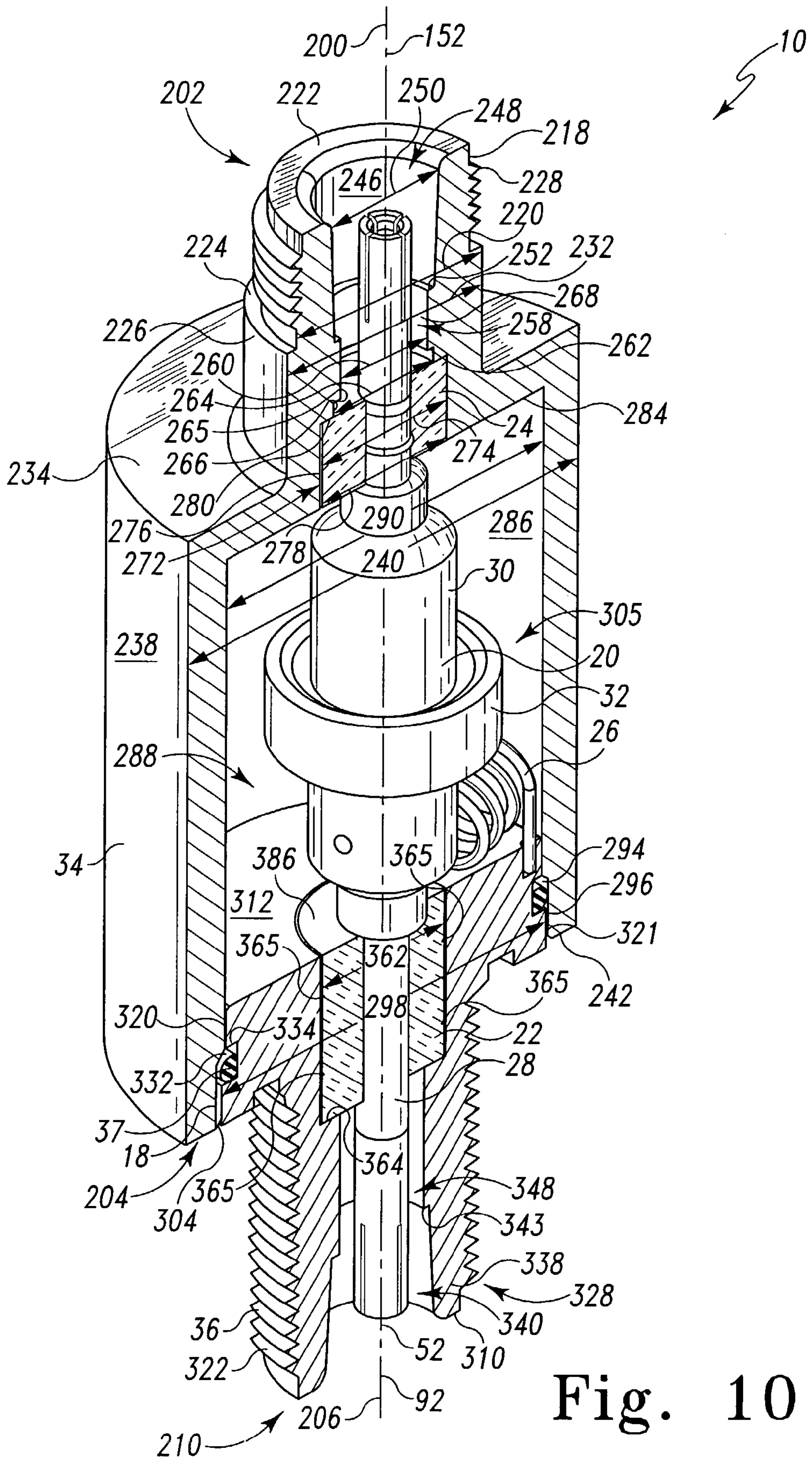
FIG. 10 is a perspective view of the surge protector of FIG. 1 with parts of the insulative material, case and bulkhead connector broken away.

As shown, for example, in FIGS. 2 and 10, protected side conductor 28 and surge side conductor 30 are mounted within housing 18 of surge protection device 10 so that the longitudinal axis 52 of protected side conductor 28 is collinear with the longitudinal axis 152 of surge side conductor 30 so that inner conductor module 20 has a longitudinal axis 92. Additionally, inwardly-facing walls 86, 186 of protected side conductor 28 and surge side conductor 30, respectively, are displaced from each other by a distance or gap 94. In a first illustrated embodiment of inner conductor module 20, dielectric material 32 fills gap 94 between inwardly-facing walls 86, 186 of protected side conductor 28 and surge side conductor 30, respectively. Dielectric material 32 extends around external walls 96, 196 and partially down inwardly-facing walls 84, 184 of protected side conductor 28 and surge side conductor 30, respectively, to rigidly couple protected side conductor 28 to surge side conductor 30. This rigid coupling of protected side conductor 28 to surge side conductor 30 maintains the precise gap 94 between protected side conductor 28 and surge side conductor 30 thus precisely controlling the capacitance of inner conductor module 20. The rigid coupling also maintains the overall length of the inner conductor module 20.

As shown, for example, in FIGS. 1, 2 and 10, case 34 and bulk head connector 36 form housing 18. Illustratively, case 34 includes a longitudinal axis 200, a proximal end 202 (selected for purposes of illustration and description as the end coupled to the transmission line and subjected to a surge) and a distal end 204. Bulk head connector 36 includes a longitudinal axis 206, a proximal end 208 and a distal end 210. When assembled with an inner conductor module 20 disposed therein, the longitudinal axis 200 of case 34, longitudinal axis 206 of bulk head connector 36 and longitudinal axis 92 of inner conductor module 20 are collinear. Illustratively, case 34 and bulk head connector 36 are most easily described as having external surfaces and internal surfaces defining structure extending therebetween concentrically located about the longitudinal axes 200, 206.

Exterior walls of case 34 include essentially three regions 212, 214, 216 having differing outside diameters. The first region 212 is the tip region. First region 212 has a cylindrical exterior wall 218 concentric about longitudinal axis 200 of case 34. First region exterior wall 218 has an outside diameter 220. First region exterior wall 218 extends distally from tip or proximal end wall 222 to a ring-shaped radially-extending wall 224 extending between first and second region exterior walls 218 and 226, respectively. External threads 228 are provided on first region exterior wall 218 for receipt of internal threads of a connector. First region exterior wall 218 has a length 229. Thus, case 34 includes a threaded surge port 230 configured to receive a connector.

Second region 214 has a cylindrical exterior wall 226 concentric about the longitudinal axis 200 of case 34. Second region exterior wall 226 has an outside diameter 232 greater than outside diameter 220 of tip region exterior wall 218. Second region exterior wall 226 extends distally from ring-shaped radially-extending wall 224 to a second ring-shaped radially-extending wall 234. Second region exterior wall 226 has a length 236. Second ring-shaped radially-extending wall 234 extends between second region exterior wall 226 and third region exterior wall 238.

Third region 216 has a cylindrical exterior wall 238 concentric about the longitudinal axis 200 of case 34. Third region exterior wall 238 has an outside diameter 240 greater than diameter 232 of second region exterior wall 226. Third region exterior wall 238 extends from second ring-shaped radially-extending wall 234 to distal end wall 242 of case 34. Third region exterior wall 238 has a length 244.

Illustratively, at tip of surge port 230, inner wall 246 and proximal end wall 222 of tip are radiused to facilitate the insertion of components of a connector therein. Inner wall 246 defines a first generally frusto-conical bore 248 concentric about longitudinal axis 200 having a maximum inside diameter 250 at proximal end 202. First bore 248 extends distally from proximal end wall 222 to an outwardly-facing ring-shaped step wall 252 displaced from the tip wall 222 by a depth 254 suitable for receiving components of a connector. At the step wall 252, first bore 248 has its minimum inside diameter 256.

A cylindrical second bore 258 concentric about longitudinal axis 200 has an inside diameter 260 less than the minimum inside diameter 256 of first bore 248. Second bore 258 extends distally from outwardly-facing step wall 252 for a length 261. A cylindrical third bore 262 concentric about longitudinal axis 200 has a diameter 264 greater than the diameter 260 of second bore 258. Third bore 262 extends inwardly from second bore 258. A ring-shaped wall 265 extends between third bore wall 266 and second bore wall 268. Third bore wall 266 has a length 270.

A cylindrical insulator-receiving bore 272 concentric about longitudinal axis 200 has a diameter 274 greater than the diameter 264 of third bore 262. Inside diameter 274 of insulator-receiving bore wall 276 is slightly greater than, or approximately equal to, outside diameter 278 of surge side insulating cylinder 24 facilitating receipt of surge side insulating cylinder 24 within insulator-receiving bore 272. Ring-shaped insulator seat wall 280 extends radially between third bore wall 266 and insulator-receiving bore wall 276. Insulator-receiving bore wall 276 extends distally from ring-shaped insulator seat wall 280 and has a length 282. A ring-shaped cavity end wall 284 extends radially between insulator-receiving bore wall 276 and cavity bore wall 286.

Cylindrical cavity bore wall 286 is concentric about longitudinal axis 200. Cavity bore 288 has an inside diameter 290 substantially greater than the inside diameter 274 of insulator-receiving bore 272. Cavity bore wall 286 extends distally from cavity end wall 284. Cavity bore wall 286 has a length 292. The distal end of cavity bore wall 286 is counter sunk to form a frusto-conical wall 294 extending to distal bore wall 296. Interior wall 294 of frusto-conical countersink has a minimum interior diameter adjacent cavity bore wall equal to the diameter 290 of cavity bore wall 286 and a maximum internal diameter adjacent distal bore wall 296 equal to the diameter 298 of distal bore wall 296. Distal bore wall 296 extends distally from the countersink wall 294 in cavity bore 288 to radially extending distal end wall 242 of case 34. Distal bore wall 296 has a length 302. A frusto-conical counter sink wall 304 is formed in the distal end of distal bore wall 296 and extends from interior wall to end wall 242 of case 34. Counter sink wall 294 and counter sink 304 facilitate insertion of bulk head connector 36 into the interior cavity 305 of case 34.

Figure 8:
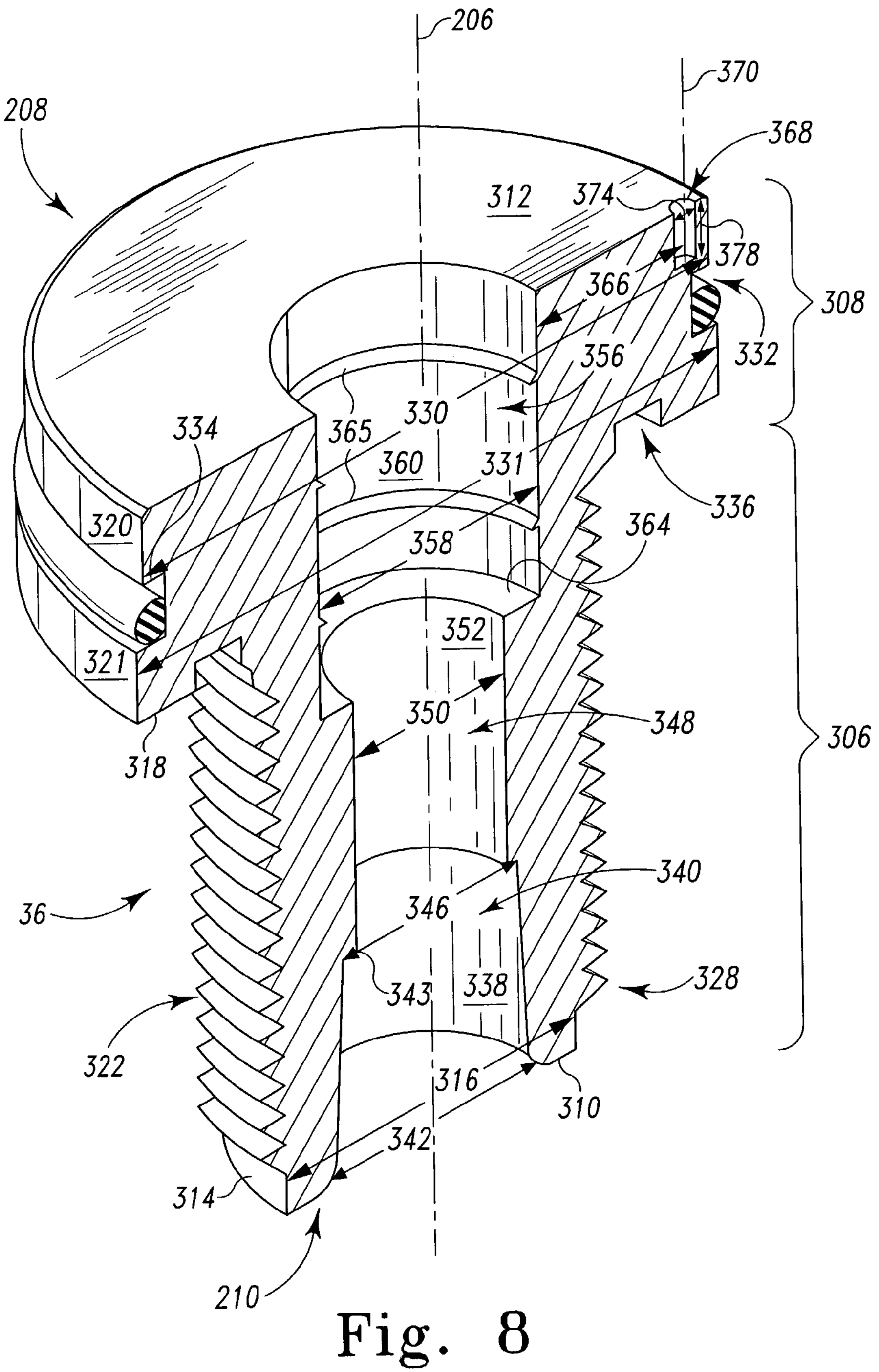
FIG. 8 is a perspective sectional view of the bulk head connector of FIG. 1.
Figure 9:
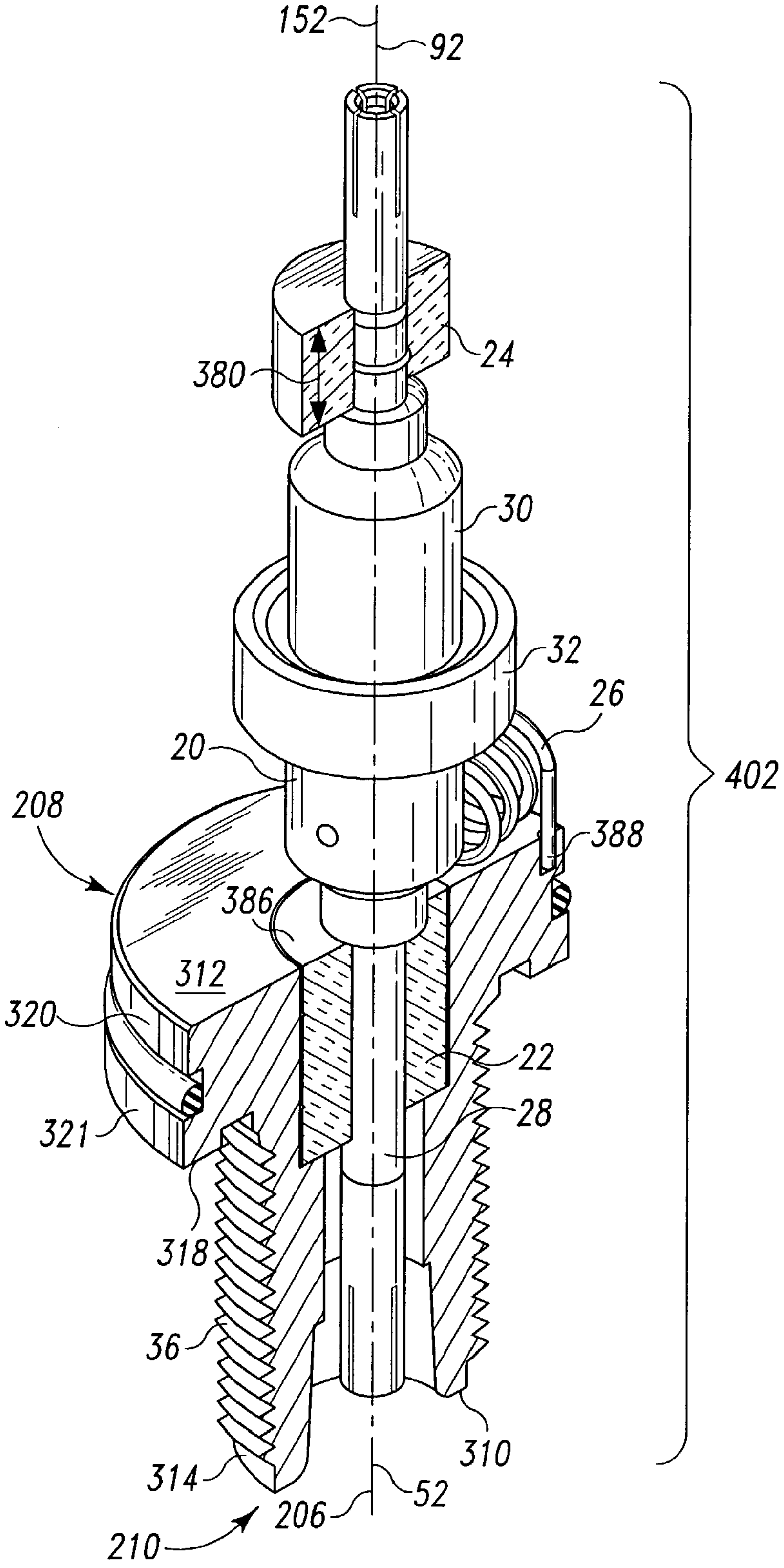
FIG. 9 is a perspective view of a subassembly of the surge protector of FIG. 1 with parts of the insulative material and bulkhead connector broken away.

Referring to FIGS. 1–2 and 8–10, and particularly to FIG. 8, exterior walls of bulk head connector 36 include essentially two regions 306, 308 which combined extend between distal end wall 310 and proximal end or cavity end wall 312. The first region 306 is the tip region. First region 306 has a cylindrical exterior wall 314 concentric about longitudinal axis 206 of bulk head connector 36. First region exterior wall 314 has an outside diameter 316. First region exterior wall 314 extends proximally from tip or distal end wall 310 to a ring-shaped radially-extending wall 318 extending between first region wall 314 and second region outer wall 321. External threads 322 are provided on first region exterior wall 314 for receipt of internal threads of a connector and threads of a hex nut 324 used to secure surge protection device 10 to chassis 15 of hardware 12. First region exterior wall 314 has a length 326. Thus, bulk head connector 36 includes a threaded protected port 328 configured to receive a connector.

The exterior walls 320, 321 of second region 308 are concentric about the longitudinal axis 206 of bulk head connector 36. Annular groove 332 is disposed between inner exterior wall 320 and outer exterior wall 321. Outer exterior wall 321 has an outside diameter 331 greater than the outside diameter 316 of tip region exterior wall 314. Outside diameter 331 of outer exterior wall 321 is slightly less than, or substantially equal to, inside diameter 298 of distal bore wall 296 of case 34. Outer exterior wall 321 has a length 333 approximately equal to length 302 of distal bore wall 296. Thus, when bulk head connector 36 is inserted into case 34, outer exterior wall 321 frictionally engages distal bore wall 296.

Inner exterior wall 320 has an outside diameter 330 less than outside diameter 331 of outer exterior wall 321 and slightly less than, or substantially equal to, the inside diameter 290 of cavity bore wall 286. Thus, when bulk head connector 36 is inserted into case 34, inner exterior wall 320 frictionally engages cavity bore wall 286. Combined, exterior walls 320, 321 and annular groove 332 of second region 308 extends proximally from ring-shaped radially-extending wall 318 to cavity end wall 312. Annular groove 332 is formed in second region between exterior walls 320, 321 for receipt of O-ring 37. Illustratively, annular groove 332 is positioned between outer exterior wall 321 and inner exterior wall 320 of second region 308 so that the proximal side wall 334 of annular groove 332 is adjacent the proximal end of frusto-conical counter sink wall 294 of case 34 when bulk head connector 36 is inserted into case 34.

When bulk head connector 36 is inserted into case 34, ring-shaped radially-extending wall 318 is flush with distal end wall 242 of case 34. Ring-shaped radially-extending wall 318 of bulk head connector 36 includes a circular groove 336 formed in the face thereof concentric about longitudinal axis 206 of bulk head connector 36. Circular groove 336 surrounds tip region 314.

Illustratively, at tip of protected port 328, inner wall 338 and distal end wall 310 of bulk head connector 36 are radiused to facilitate the insertion of components of a connector therein. Inner wall 338 defines a first generally frustoconical bore 340 concentric about longitudinal axis 206 having a maximum inside diameter 342 adjacent distal end wall 310. First bore wall 338 extends proximally from distal end wall 310 of protected port to an outwardly-facing ring-shaped step wall 343 displaced from the tip by a depth 344 suitable for receiving components of a connector. At the step wall 343, first bore wall 338 has its minimum inside diameter 346.

A cylindrical second bore 348 concentric about longitudinal axis 206 has an inside diameter 350 less than the minimum inside diameter 346 of first bore wall 338. Second bore wall 352 extends proximally from outwardly-facing step wall 343 for a length 354.

A cylindrical insulator-receiving bore 356 concentric about longitudinal axis 206 has a diameter 358 greater than the diameter of second bore 348. Inside diameter 358 of insulator-receiving bore wall 360 is slightly greater than, or approximately equal to, outside diameter 362 of protected side insulating cylinder 22 facilitating receipt of protected side insulating cylinder 22 within insulator-receiving bore 356. Ring-shaped insulator seat wall 364 extends radially between second bore wall 352 and insulator-receiving bore wall 360. Insulator-receiving bore 356 extends proximally a length 363 from ring-shaped insulator seat wall 364 to ring-shaped cavity end wall 312. Ring-shaped cavity end wall 312 extends radially between insulator-receiving bore wall 360 and second region exterior wall 320. As shown for example in FIG. 8, insulator-receiving bore wall 360 may be formed to include radially inwardly projecting, annularly extending retention features 365 to aid in retaining protected side insulating cylinder 22 therein during assembly.

Ring-shaped cavity end wall 312 is concentric about longitudinal axis 206. At a radial distance 366 from longitudinal axis 206, an inductor-receiving hole 368 having an axis 370 parallel to longitudinal axis 206 is formed through cavity end wall 312 extending into bulk head connector 36. Inductor-receiving hole 368 has a diameter 374 approximately equal to or slightly greater than the diameter 376 of wire used to form inductor 26. Inductor-receiving hole 368 has a depth 378 sufficient to receive a substantial portion of second end non-coiled portion 388 of inductor 26 therein. During assembly of surge protection device 10, a staking operation is performed to secure second end non-coiled portion 388 of inductor 26 in inductor-receiving hole 368. Thus, inductor 26 is coupled to ground 16 through a solderless connection to housing 18.

Surge side insulating cylinder 24 has a length 380 approximately equal to length 282 of insulator-receiving bore 272. Similarly, protected side insulating cylinder 22 has a length 382 approximately equal to length 363 of insulator-receiving bore 360. Thus, in the assembled surge protector 10, when surge side insulating cylinder 24 is received in insulator-receiving bore 272 and seated against insulator seat wall 280, inner ring-shaped surface 384 of surge side insulating cylinder 24 is flush with cavity end wall 284. Similarly, when protected side insulating cylinder 22 is received in insulator-receiving bore 360 and seated against insulator seat wall 364, inner ring-shaped surface 386 of protected side insulating cylinder 22 is flush with cavity end wall 312.

Illustratively, inductor 26 is formed from a length of wire or other conductive material. Inductor 26 includes a first or conductor end portion 90, a second or bulk head connector end portion 388 and a coil portion 390. Coil portion 390 includes a number of turns sufficient to provide the necessary inductance to properly tune the L-C filter circuit for the desired bandwidth of operation. First or conductor end portion 90 includes a first straight portion 392, a bend 394 and a second straight portion 396 . Illustratively, first straight portion 392 has a length 398 slightly greater than one half of the length of inductor-receiving hole 88 in third transition 48 of protected side conductor 28. Illustratively, second straight portion 396 has a length 400 slightly greater than one half of the length of inductor-receiving hole 88 in third transition 48 of protected side conductor 28. Those skilled in the art will recognize that when inserted in inductor-receiving aperture 88, the straight shaft of the hole 88 will straighten the bend 394 somewhat creating lateral forces urging the inductor 26 into three points of contact (at the wall of hole 88 adjacent each opening of hole 88 and near longitudinal axis 52) with the protected side conductor 28. This provides a solder-free connection reducing manufacturing and assembly costs.

Figure 5:
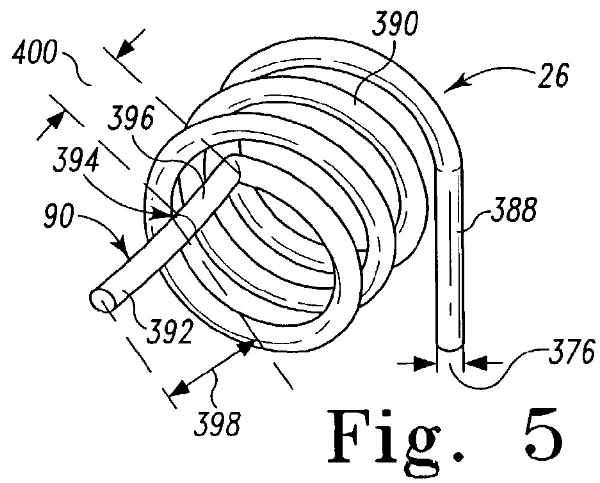
FIG. 5 is a perspective view of the inductive coil conductor of FIG. 1.

In a preferred embodiment of a method for manufacturing an inner conductor module 20, conductors 28 and 30 are provided as shown for example in FIGS. 3 and 4, with at least one such conductor 28 including an inductor-receiving hole 88 extending laterally therethrough. As shown, for example, in FIG. 5, an inductor is provided having an end 90 configured to mechanically and electrically couple the inductor 26 to conductor 28 when the end 90 is placed in hole 88.

Figure 6:
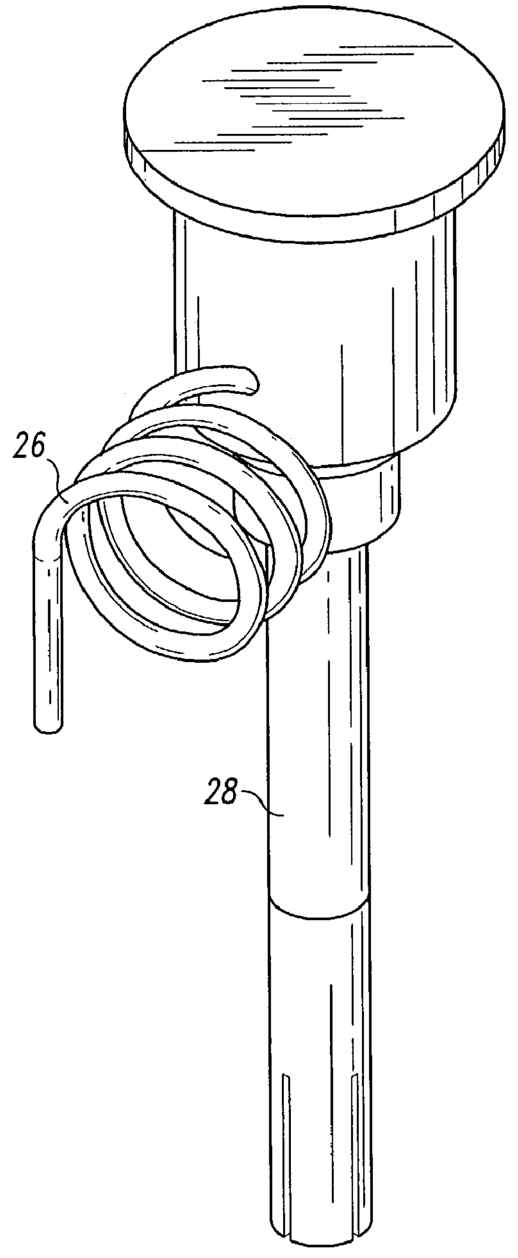
FIG. 6 is a perspective view of the inductive coil solderlessly connected to the surge side conductor of FIG. 1.

As shown, for example, in FIG. 6, end 90 of the inductor 26 is inserted in hole 88 of the connector 28. Those skilled in the art will recognize that although inductor 26 is illustrated as being coupled to the conductor 28 prior to an injection molding process, such inductor 26 preferably will not be inserted in inductor-receiving hole 88 until after injection molding is completed to reduce mold complexity.

Figure 11:
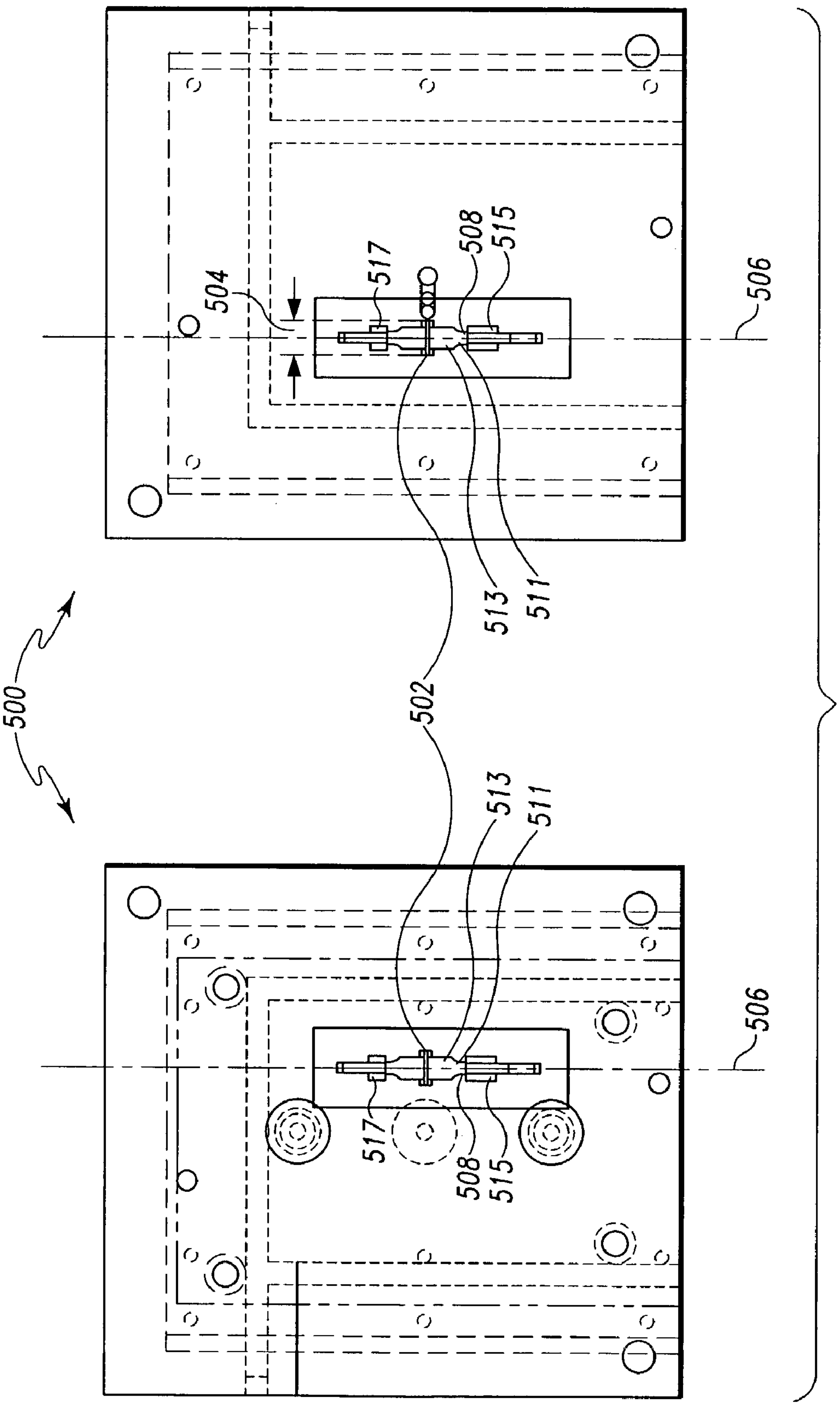
FIG. 11 is a diagrammatic view of a mold for fabricating the inner conductor module.

The provided conductors are placed in cavities a mold 500, such as that shown in FIG. 11, of an injection molding apparatus so that plates 50, 150 are received in a central cavity 502. Preferably, a pin is brought into contact with the outwardly-facing walls 84, 184 of contacts 28, 30, respectively, to hold off on such surface. Pin does not engage the surface of outwardly-facing wall 84, 184 adjacent the peripheral edge of such wall 84, 184 so that injected dielectric material can mold around plates 50, 150 to encase the inwardly-facing circular walls 86, 186, the outer edges 96, 196 and the peripheral edges of the outwardly-facing circular walls 84, 184 in dielectric material 32. When conductors 28, 30 are placed in the mold 500, plates 50, 150 of conductors 28, 30 are received in central cavity 502 having an inside diameter 504 greater than the outside diameter 82, 182 of plates 50, 150. This difference in inside diameter 504 of the central cavity and the outside diameter 82, 182 of the plates 50, 150 of the conductor 28, 30 creates a space permitting a web 110 of dielectric material 32 to be formed. When dielectric material 32 is injected into the central cavity 502, a gap filling portion 112 of dielectric material 32 is molded between inwardly-facing walls 86, 186 of plates 50, 150. Webs 110 extend longitudinally across the outer walls 96,196 of plates 50, 150 and lips 114 project radially-inwardly along the outwardly-facing walls 84, 184 of plates 50, 150. Those skilled in the art will recognize that conductors 28 are coupled together to form a single inner conductor module 20 during the injection molding process.

Illustratively, mold 500 includes a plurality of cavities concentrically formed about the longitudinal axis 506 of mold 500. Mold 500 is formed to have cavities 508, 510, 512 identically conforming to the external walls of first 44, 144, second 46, 146, and third 48, 148 transitions, respectively, of each conductor. Immediately adjacent the outwardly-facing walls 64, 164 of the first transition 44, 144, mold 500 is formed to include cavities 514, 516 having a diameter approximately equal to the inside diameter 274, 358 of insulator-receiving bore in case 34 and bulk head connector 36, respectively. The diameter of cavities 514, 516 is substantially greater than the diameter 54, 154 of shaft 40, 140 and diameter of retention ring 42, 142. Cavity 514 has a length approximately equal to depth 363 of insulator-receiving bore 356. Cavity 516 has a length approximately equal to depth 282 of insulator-receiving bore 276.

Centrally located in die is a cavity 502 having a diameter 504 greater than the diameter 82, 182 of plates 50, 150. Cavity 502 has a length equal to the sum of the thicknesses 80 and 180 of plates 50 and 150, respectively, plus two times the thickness of the lip 114 of dielectric material desired plus the thickness of dielectric material desired to fill gap 94 between the plates 50, 150. As shown, for example in FIG. 2, after injection molding, dielectric material 32 partially encapsulates plates 50, 150 of both conductors 28, 30.

Figure 7:
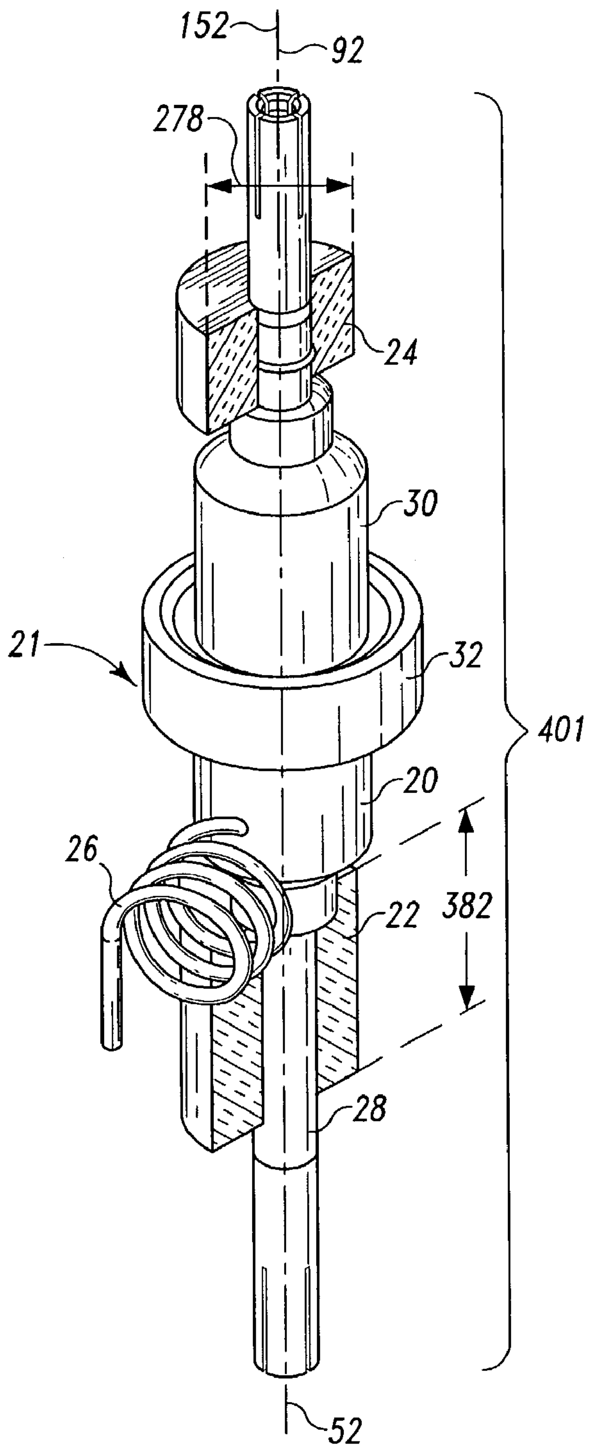
FIG. 7 is a perspective view, with parts of the insulative material broken away, of the inner conductor module of FIG. 1.

Illustratively, dielectric material 32 and insulating cylinders 22, 24 are simultaneously injection molded onto conductors 28, 30 to form an insulated inner connector module 21. However, those skilled in the art will recognize that the injection molding of dielectric material 32 and insulating cylinders 22, 24 onto inner conductor module 20 may be performed in separate steps. The described injection molding process of dielectric material 32 around and between plates 50, 150 precisely locates the plates 50, 150 with respect to one another, controls the displacement of the pin ends 38, 138 from one another and controls the capacitance of the inner conductor module 20 to a high degree. Thus, in the illustrated embodiment, insulators 22, 24 and dielectric material 32 are simultaneously injection molded onto conductors 28, 30 to form insulated inner conductor module 21. In the illustrated embodiment, dielectric material 32, and insulating cylinders 22, 24 are made from an appropriate dielectric material such as TPX dielectric, Mitsui RT 18, or other material of known acceptable dielectric properties. After injection molding and coupling of inductor 26 to protected side conductor 28, a subassembly 401 such as that shown in FIG. 7 is available for assembly with bulk head connector 36.

Insulated inner conductor module 21 is mounted to bulk head connector 36 by inserting female bulk head end connector 38 through insulator-receiving bore 356, second bore 348 and into first frusto-conical bore 340. Protected side insulating cylinder 22 is inserted into insulator-receiving bore 356 in bulk head connector 36 until seated against insulator seat step wall 364. Inductor 26 is then coupled between bulk head connector 36 and protected side conductor 28. Illustratively, bulk head connector end 388 of inductor 26 is staked within inductor-receiving hole 368 in bulk head connector 36.

Conductor end 90 of inductor coil 26 is swaged to protected side conductor 28 by insertion of conductor end 90 of inductor coil 26 into inductor-receiving hole 88. Because conductor end 90 of inductor 26 is bent, insertion of conductor end 90 into inductor-receiving hole 88 causes inductor 26 to be swaged to protected side conductor 28 and maintain solid electrical contact with conductor 28. O-ring 27 is inserted into annular groove 332 in bulk head connector 36. Thus, insulated inner conductor module 21, inductor 26, bulk head connector 36 and O-ring 27 form a surge protector sub-assembly 402, shown, for example, in FIG. 9.

Surge protector sub assembly 402 is coupled to case 34 by inserting female connector 138 through insulator-receiving bore 272, third bore 262, second bore 258 and into frusto-conical first bore 248. Simultaneously, surge side insulating cylinder 24 is inserted into insulator-receiving bore 272 and seated against insulator seat wall 280 and external walls 320, 321 of bulk head connector 36 is pushed into internal cavity 305 of case 34 until radially-extending wall 318 of bulk head connector 36 is flush with distal end wall of case 34. Contact between second region walls 320, 321 of bulk head connector 36 and cavity bore wall 286 and distal bore wall 296, respectively, electrically couples case 34 to bulk head connector 36 to form an outer conductor. During insertion, O-ring 37 is compressed between inner frusto-conical wall 294 of case 34 and the floor of annular groove 332 of bulk head connector 36 to form a weatherproof seal.

In the preferred embodiment, surge protector 10 is a stack assembly. Bulk head connector 36 is held on an appropriate pallet or tool holder while insulated inner conductor module 21 is pressed into bulk head connector 36 to form subassembly 402. A staking operation is performed on subassembly 402 to stake inductor 26 to bulk head connector 36. Case 34 is then pressed onto subassembly 402 to complete assembly of surge protection device 10.

Illustratively, those portions of conductors 28, 30 other than end connectors 38, 138 are each monolithic. Illustratively, conductors 28, 30 are cast from an appropriate conductive material such as aluminum, copper, gold, or other conductive material. Because, many end connectors 38, 138 require flexible fingers for proper connection, the appropriate connector is coupled to the conductor 28, 30. However, it is within the scope of the disclosure for connectors 38, 138 to be monolithically cast with the rest of the conductors 28, 30, respectively.

Illustratively, case 34 and bulkhead connector 36 are cast from brass and plated with trimetal. It is within the scope of the disclosure for case 34 and bulk head connector 36 to be cast or otherwise manufactured from other appropriate conductive material.

Figure 13:
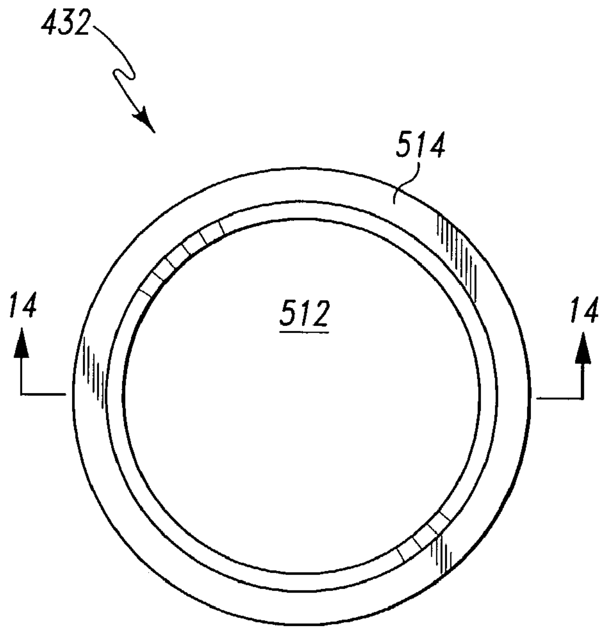
FIG. 13 is a plan view of the snap-on dielectric of FIG. 12.
Figure 12:
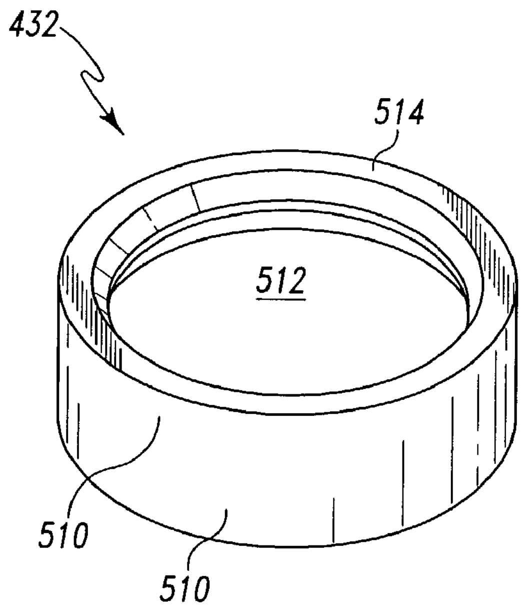
FIG. 12 is a perspective view of an alternative snap-on dielectric for mechanically and capacitively coupling surge side and protected side conductors.
Figure 14:
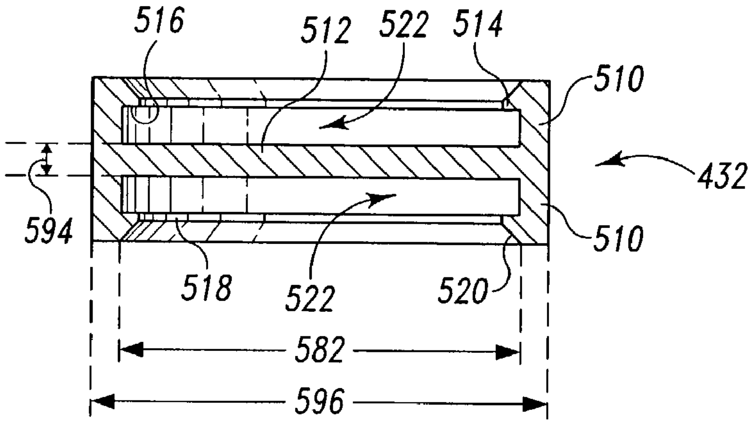
FIG. 14 is a sectional view taken along line 14—14 of FIG. 13 of the snap-on dielectric.

In an alternative embodiment of the disclosed invention, a snap-on dielectric 432 is provided for mechanically and capacitively coupling protected side conductor 28 to surge side conductor 30 to form inner conductor module 20, as shown, for example, in FIGS. 12–14. Snap-on dielectric 432 is illustratively very similar to dielectric material 32 but is molded in a separate molding operation. Because of the similarities between dielectric material 32 and snap-on dielectric 432, similar reference numerals will be used for similar parts. Snap on dielectric 432 includes a central disk-shaped plate-separating or gap-filling portion 512 having a thickness 594 equal to the desired gap 94 between plates 50, 150 of conductors 28, 30, respectively. Gap filling portion 512 has a diameter 596 exceeding diameters 82, 182 of plates 50, 150 of conductors 28, 30, respectively. Webs 510 extend longitudinally from the peripheral edges of gap filling portion 512. Webs have an inside diameter 582 equal to the outside diameters 82, 182 of plates 50, 150 of conductors 28, 30. Lips 514 project radially inwardly from webs 510. Lips 514 have a ring-shaped plate back-engaging wall 516, an annular wall 518 and a tapered wall 520. Two plate-receiving cavities 522 are defined by gap filling portion 512, interior walls 511 of webs 510 and ring-shaped plate back-engaging walls 516 of lips 514. Annular walls 518 define opening into cavities 522. Tapered walls 520 facilitate insertion of plates 50, 150 of conductors 28, 30 into cavities 522.

While specific embodiments of surge protection devices 10 and methods for manufacturing and assembling surge protection devices have been described, those skilled in the art will recognize that other arrangements of components and steps are within the teaching of the disclosure.

What is claimed is:

1. A surge protector for a signal receiving device configured to receive signals via a coaxial line having a signal carrying inner wire and a grounded outer conductor, the surge protector comprising:

an inner conductor exhibiting a capacitance, said inner conductor being configured for attachment to the inner wire of the coaxial line;

an outer conductor disposed about and insulated from the inner conductor, the outer conductor being configured for attachment to the outer conductor of the coaxial line;

insulating material electrically insulating the inner conductor from the outer conductor; and an inductor electrically connected between the inner conductor and the outer conductor, said inductor having one end solderlessly attached to the inner conductor and an opposite end solderlessly attached to the outer conductor, wherein the inductor includes an inner conductor end, an outer conductor end and a coil disposed between the inner conductor and outer conductor ends, and wherein the inner conductor includes an exterior surface concentric about a longitudinal axis and includes a cylindrical wall defining a hole extending through the surface and the longitudinal axis and the inner conductor end of the inductor includes a bent portion which when inserted into the hole mechanically and electrically couples the inductor to the inner conductor.

2. The device of claim 1 wherein at least a portion of the outer conductor end of the inductor is received in a hole formed in the outer conductor.

3. A surge protector for a signal receiving device configured to receive signals via a coaxial line having a signal carrying inner wire and a grounded outer conductor, the surge protector comprising:

an inner conductor exhibiting a capacitance, said inner conductor being configured for attachment to the inner wire of the coaxial line, said inner conductor including a first conductor having a wire end and a plate, a second conductor having a device end and a plate, and a dielectric portion configured to snap fit over the plates of the first and second conductor to capacitively and mechanically couple the first and second conductors;

an outer conductor disposed about and insulated from the inner conductor, the outer conductor being configured for attachment to the outer conductor of the coaxial line;

insulating material electrically insulating the inner conductor from the outer conductor; and an inductor inductively coupling the inner conductor and outer conductor, wherein the inner conductor includes an exterior surface concentric about a longitudinal axis and includes a cylindrical wall defining a hole extending through the surface and the longitudinal axis and the inductor includes a bent portion which when inserted into the hole mechanically and electrically couples the inductor to the inner conductor.

4. The device of claim 3 wherein the inductor is solderlessly connected to the inner conductor.

5. The device of claim 3 wherein the insulating material includes a first insulating material insulating the first conductor from the outer conductor and a second insulating portion insulating the second conductor from the outer conductor.

6. A surge protector for a signal receiving device configured to receive signals via a coaxial line having a signal carrying inner wire and a grounded outer conductor, the surge protector comprising:

an inner conductor exhibiting a capacitance, said inner conductor being configured for attachment to the inner wire of the coaxial line, said inner conductor including an exterior surface concentric about a longitudinal axis and including a cylindrical wall defining a hole extending through the surface and the longitudinal axis;

an outer conductor disposed about and insulated from the inner conductor, the outer conductor being configured for attachment to the outer conductor of the coaxial line;

insulating material electrically insulating the inner conductor from the outer conductor; and an inductor inductively coupling the inner conductor and outer conductor, said inductor including an outer conductor end, a coil portion and an inner conductor end including a straight section adjacent the coil coupled by a bend to a distal straight section, wherein when the inner conductor end is received in the hole, the inner conductor end is flexed to provide three points of contact between the inductor and the inner conductor.

7. The device of claim 6 wherein the inductor is solderlessly connected to the inner conductor.

8. The device of claim 6 wherein the hole is a through hole and one point of contact is on the cylindrical wall adjacent the longitudinal axis.

9. The device of claim 8 wherein the outer conductor is formed to include a cylindrical wall defining a hole and the outer conductor end is received in the hole in the outer conductor.

10. A method of manufacturing a surge protection device for a signal receiving device configured to receive signals via a coaxial line having a signal carrying inner conductor and a grounded outer conductor, the method comprising the steps of:

providing an insulated inner conductor having a first insulating portion coupled to a first conductor configured to be coupled to a signal carrying component of the signal receiving device, and a second insulating portion coupled to a second conductor configured to be coupled to the inner conductor of the coaxial line, said first and second conductors being capacitively coupled;

providing an inductor;

providing a two component outer conductor each component of which is configured to include a cavity sized to receive one of the first and second insulating portions therein and configured to couple to the other component of the outer conductor, one component of outer conductor being configured to be coupled to an outer conductor of the coaxial line and the other component being configured to be coupled to a ground of the signal receiving device;

inserting the first insulating portion of the insulated inner conductor into the cavity of a selected one of the components of the outer conductor;

electrically connecting the inductor between the insulated inner conductor and the selected one of the components of the outer conductor;

inserting the second insulating portion of the insulated inner conductor into the cavity of the other component of the outer conductor;

coupling the two components of the outer conductor whereby the inner conductor is electrically insulated from, but inductively coupled to, the outer conductor, wherein the provided inductor includes an inner conductor end and an outer conductor end, the provided insulated inner conductor includes an inductor-receiving hole, the selected component of the outer conductor includes an inductor-receiving hole and wherein the coupling the inductor step includes the steps of inserting the inner conductor end into the inductor-receiving hole of the insulated inner conductor and inserting the outer conductor end into the inductor-receiving hole of the selected component of the outer conductor.

11. The method of claim 10 wherein the provided insulated inner conductor includes dielectric material mechanically and capacitively coupling the first conductor to the second conductor, and wherein the step of providing the insulated inner conductor includes the step of simultaneously molding the first insulating portion and the second insulating portion to the first and second conductors.

12. The method of claim 2 wherein the step of providing the insulated inner conductor includes the step of simultaneously molding the first insulating portion, the second insulating portion and the dielectric material to the first and second conductors.

13. The method of claim 10 wherein the inserting the outer conductor end into the inductor-receiving hole of the selected component of the outer conductor step and the inserting the first insulating portion of the insulated inner conductor into the cavity of a selected one of the components of the outer conductor step are performed simultaneously.

14. The method of claim 13 wherein one component of the provided two component outer conductor is a case having a cavity therein and the other component of the provided two component outer conductor is a plug configured to be received in the cavity of the case.

15. The method of claim 14 wherein the plug is the selected component.

16. The method of claim 10 wherein the inner conductor end of the provided inductor includes a bent portion and wherein the inserting the inner conductor end into the inductor-receiving hole step causes deformation of the bent portion to generate a restorative force acting to couple the inductor to the inner conductor.

17. The method of claim 10 and further comprising the step of staking the outer conductor end of the inductor into the inductor-receiving hole.

18. The method of claim 10 wherein the providing the insulated inner conductor step includes the step of casting the first and second conductors.

19. The method of claim 10 wherein the providing the two component outer conductor step includes the step of casting the two components.

20. The method of claim 10 wherein the coupling the two components of the outer conductor step includes the step of pressing the other component onto the selected component.

21. The method of claim 20 wherein the inserting the second insulating portion of the insulated inner conductor into the cavity of the other component of the outer conductor step and the coupling the two components of the outer conductor step are performed simultaneously.

22. The method of claim 10 wherein the inserting the inner conductor end into the inductor-receiving hole of the insulated inner conductor is performed prior to the inserting the outer conductor end into the inductor-receiving hole of the selected component of the outer conductor to form an inner conductor subassembly.

23. The method of claim 22 wherein following the forming an inner conductor sub-assembly step, the inserting the first insulating portion of the insulated inner conductor into the cavity of a selected one of the components of the outer conductor step and the inserting the outer conductor end into the inductor-receiving hole of the selected component of the outer conductor step are performed to form a subassembly.

* * * * *